United States Patent
Hirano

(10) Patent No.: US 9,863,541 B2
(45) Date of Patent: Jan. 9, 2018

(54) SPRING LOAD ADJUSTING APPARATUS AND MANUFACTURING METHOD THEREOF

(71) Applicant: DENSO CORPORATION, Kariya, Aichi-pref. (JP)

(72) Inventor: Akinori Hirano, Nagoya (JP)

(73) Assignee: DENSO CORPORATION, Kariya (JP)

( * ) Notice: Subject to any disclaimer, the term of this patent is extended or adjusted under 35 U.S.C. 154(b) by 968 days.

(21) Appl. No.: 13/728,085

(22) Filed: Dec. 27, 2012

(65) Prior Publication Data
US 2013/0161550 A1 Jun. 27, 2013

(30) Foreign Application Priority Data

Dec. 27, 2011 (JP) .................................. 2011-285695
Jun. 20, 2012 (JP) .................................. 2012-138700

(51) Int. Cl.
| F16K 1/52 | (2006.01) |
| B21J 5/00 | (2006.01) |
| B21K 25/00 | (2006.01) |
| F16K 11/07 | (2006.01) |

(52) U.S. Cl.
CPC ................ F16K 1/523 (2013.01); B21J 5/00 (2013.01); B21K 25/00 (2013.01); F16K 11/07 (2013.01); *Y10T 29/49908* (2015.01)

(58) Field of Classification Search
CPC ...... F16K 1/523; F16K 11/07; F16K 31/0613; F16F 1/122; B21J 5/00
USPC ........ 267/169, 174, 175, 177, 178, 179, 182
See application file for complete search history.

(56) References Cited

U.S. PATENT DOCUMENTS

| 4,838,518 A | * | 6/1989 | Kobayashi et al. ..... 251/129.16 |
| 5,000,222 A | * | 3/1991 | Moenkhaus et al. .... 137/505.41 |
| 5,014,747 A | * | 5/1991 | Suzuki et al. ........... 137/625.65 |
| 5,470,049 A | * | 11/1995 | Wohler et al. ................. 267/172 |
| 6,457,704 B1 | * | 10/2002 | Van Eerden et al. ......... 267/179 |
| 2001/0025662 A1 | * | 10/2001 | Kawamura et al. ..... 137/625.65 |

(Continued)

FOREIGN PATENT DOCUMENTS

| JP | 52-053258 | 4/1977 | |
| JP | 09166238 A | * | 6/1997 | ............. F16K 31/06 |

(Continued)

OTHER PUBLICATIONS

Office Action (1 page) dated Dec. 3, 2013, issued in corresponding Japanese Application No. 2012-138700 and English translation (2 pages).

(Continued)

*Primary Examiner* — Xuan Lan Nguyen
(74) *Attorney, Agent, or Firm* — Nixon & Vanderhye P.C.

(57) ABSTRACT

A sleeve has a female thread, which is formed in an inner peripheral surface of the sleeve. An adjust screw adjusts a spring load of a spring, which is placed in an inside of the sleeve. The adjust screw has a male thread, which is formed in an outer peripheral surface of the adjust screw and is threadably engaged with the female thread. The sleeve has at least one protrusion that is formed integrally with the rest of the sleeve and is urged against the adjust screw toward the spring in an axial direction to urge the male thread against the female thread and thereby to provide a predetermined degree of sealing between the male thread and the female thread.

18 Claims, 9 Drawing Sheets

(56) References Cited

U.S. PATENT DOCUMENTS

| | | | |
|---|---|---|---|
| 2003/0020221 A1* | 1/2003 | Pare | 267/179 |
| 2007/0023722 A1* | 2/2007 | Oishi | 251/129.15 |
| 2010/0243933 A1 | 9/2010 | Shimizu et al. | |
| 2012/0049097 A1* | 3/2012 | Morise | 251/324 |

FOREIGN PATENT DOCUMENTS

| | | | |
|---|---|---|---|
| JP | 10-231946 | 9/1998 | |
| JP | 2000-252721 | 9/2000 | |
| JP | 2005-076687 | 3/2005 | |
| WO | WO 2010134216 A1 * | 11/2010 | F16K 31/06 |

OTHER PUBLICATIONS

Office Action (6 pages) dated Jul. 21, 2014, issued in corresponding Chinese Application No. 201210579592.8 and English translation (4 pages).

Office Action (1 page) dated Jul. 29, 2014, issued in corresponding Japanese Application No. 2012-138700 and English translation (2 pages).

* cited by examiner

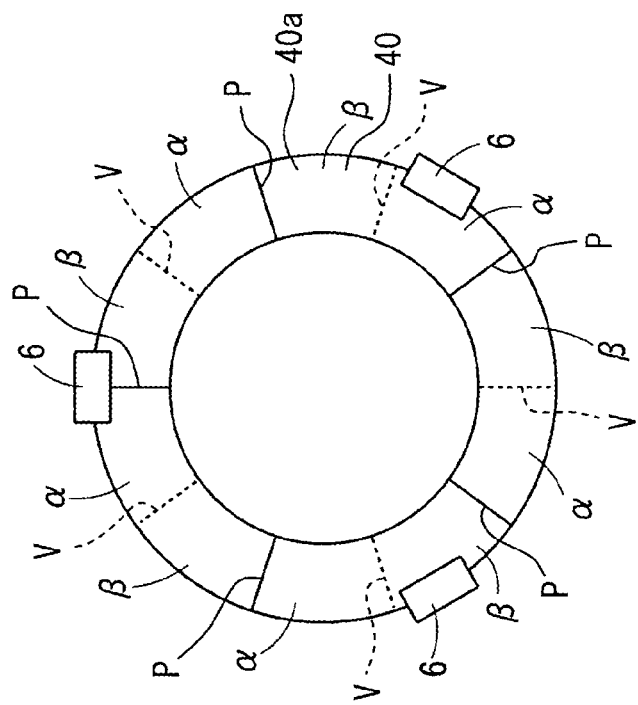
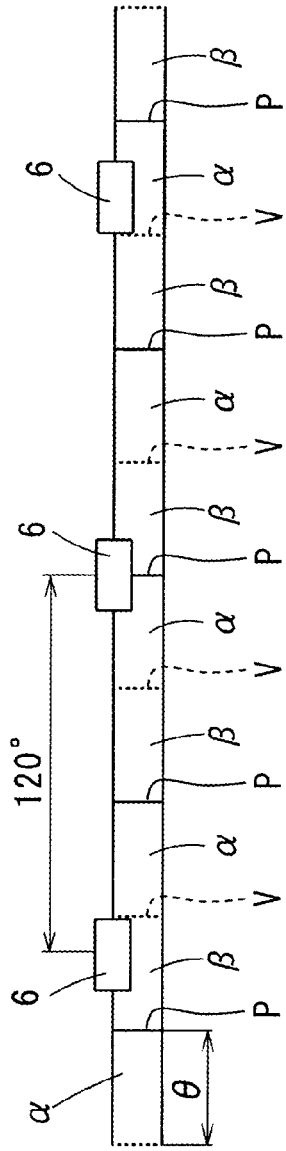
FIG. 3A
FIG. 3B

SPRING LOAD ADJUSTING APPARATUS AND MANUFACTURING METHOD THEREOF

CROSS REFERENCE TO RELATED APPLICATION

This application is based on and incorporates herein by reference Japanese Patent Application No. 2011-285695 filed on Dec. 27, 2011 and Japanese Patent Application No. 2012-138700 filed on Jun. 20, 2012.

TECHNICAL FIELD

The present disclosure relates to a spring load adjusting apparatus and a manufacturing method thereof.

BACKGROUND

For example, JPH10-231946A teaches a spring load adjusting apparatus that requires sealing between a sleeve (serving as a female-threaded member) and an adjust screw and is provided in a spool valve.

The technique of JPH10-231946A will now be described with reference to FIG. 10. The spring load adjusting apparatus of FIG. 10 includes the sleeve 102, which serves as the female-threaded member. A cylindrical hole J1, which forms a cylindrical inner peripheral wall, extends in the sleeve 102 in an axial direction. The adjust screw 104 has a cylindrical tubular portion J2. The cylindrical tubular portion J2 is inserted into the cylindrical hole J1 and seals between the cylindrical hole J1 and the cylindrical tubular portion J2.

In JPH10-231946A, the adjust screw 104 needs to be arranged such that the adjust screw 104 is threadably rotatable relative to the sleeve 102. Therefore, an annular clearance C needs to be formed between the cylindrical hole J1 and the cylindrical tubular portion J2.

Furthermore, according to JPH10-231946A, the required sealing is achieved between the cylindrical hole J1 and the cylindrical tubular portion J2. Therefore, the annular clearance C between the cylindrical hole J1 and the cylindrical tubular portion J2 needs to be very small.

Thus, both of the sleeve 102 and the adjust screw 104 need to be processed with high accuracy (high processing precision), and this requirement will result in an increase in the costs of the spring load adjusting apparatus and thereby the costs of the spool valve.

Furthermore, the technique of JPH10-231946A provides the required sealing between the cylindrical hole J1 and the cylindrical tubular portion J2. In order to provide the required sealing between the cylindrical hole J1 and the cylindrical tubular portion J2, a seal length L (an axial extent of an overlapped area between the cylindrical hole J1 and the cylindrical tubular portion J2) needs to be increased.

Therefore, the axial size of the spring load adjusting apparatus is disadvantageously increased, and thereby a size of the spool valve, which has the spring load adjusting apparatus, is disadvantageously increased.

SUMMARY

The present disclosure addresses the above disadvantages.

According to the present disclosure, there is provided a spring load adjusting apparatus, which includes a female-threaded member and an adjust screw. The female-threaded member has a female thread, which is formed in an inner peripheral surface of the female-threaded member. The adjust screw adjusts a spring load of a spring, which is placed in an inside of the female-threaded member. The adjust screw has a male thread, which is formed in an outer peripheral surface of the adjust screw and is threadably engaged with the female thread. The female-threaded member has at least one protrusion that is formed integrally with the rest of the female-threaded member and is urged against the adjust screw toward the spring in an axial direction to urge the male thread against the female thread and thereby to provide a predetermined degree of sealing between the male thread and the female thread.

According to the present disclosure, there is also provided a manufacturing method of a spring load adjusting apparatus. According to the manufacturing method, an adjust screw is tightened into a female-threaded member made of metal to adjust a spring load of a spring placed in an inside of the female-threaded member. Then, at least one portion of the female-threaded member is plastically deformed to form at least one protrusion that is urged against the adjust screw toward the spring in an axial direction, so that a male thread, which is formed in an outer peripheral surface of the adjust screw, is urged against a female thread, which is formed in an inner peripheral surface of the female-threaded member, and thereby a predetermined degree of sealing is provided between the male thread and the female thread.

BRIEF DESCRIPTION OF THE DRAWINGS

The drawings described herein are for illustration purposes only and are not intended to limit the scope of the present disclosure in any way.

FIG. 3A is a schematic end view of the adjust screw of the first embodiment, showing a relationship of primary and secondary slopes of the adjust screw relative to the forged protrusions of the sleeve;

FIG. 3B is a schematic exploded view showing the relationship of the primary and secondary slopes of the adjust screw relative to the forged protrusions of the sleeve according to the first embodiment;

DETAILED DESCRIPTION

Figure 1A:
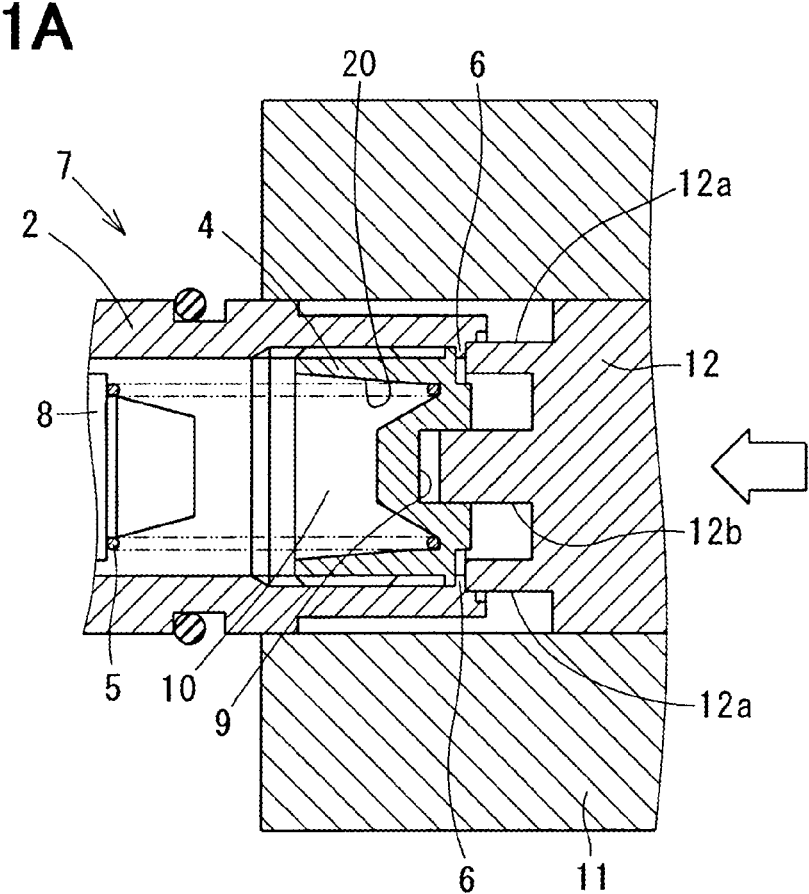
FIG. 1A is a descriptive diagram showing a process of axially pressing an adjust screw with forged protrusions according to a first embodiment of the present disclosure.

Various embodiments of the present disclosure will be described with reference to the accompanying drawings.

In the following embodiments, each of corresponding similar components, which have a corresponding common function, will be indicated by the same corresponding reference numeral throughout the specification.

First Embodiment

Now, a first embodiment of the present disclosure will be described with reference to FIGS. 1A to 3B.

In the present embodiment, a spring load adjusting apparatus is provided in a spool valve 7 that is used in a hydraulic pressure control apparatus of an automatic transmission of a vehicle (e.g., an automobile). In the present embodiment, a linear solenoid (a solenoid actuator) is used as a specific example of a drive device of the spool valve 7. However, the drive device of the spool valve 7 is not limited to the linear solenoid and may be changed to any other appropriate device.

The spool valve 7 has a known basic structure. Specifically, the spool valve 7 includes a sleeve (female-threaded member) 2, a spool 8 and a spring 5. The sleeve 2 is configured into a generally cylindrical tubular form and is made of metal. The spool 8 is received in an inside of the sleeve 2 and is slidable in an axial direction. The spring 5 is placed in the inside of the sleeve 2 and urges the spool 8 toward an axial side that is the left side in FIG. 1A (i.e., the side where the linear solenoid is located).

A type of a valve structure of the spool valve 7 is not limited to any particular one. For instance, the spool valve 7 may be a normally closed type (a type of spool valve, from which an output hydraulic pressure is drained in a deenergized state of the linear solenoid) or a normally open type (a type of spool valve, in which the output hydraulic pressure is maximized in the deenergized state of the linear solenoid).

The spring 5 is a compression coil spring, which is spirally wound in a cylindrical form. The spring 5 exerts a spring force that urges the spool 8 toward the left side in FIGS. 1A and 1B (the side where the linear solenoid is located) against a drive force of the linear solenoid.

The linear solenoid, which drives the spool valve 7 (more specifically, the spool 8), is fixed to an end portion of the spool valve 7. Energization of the linear solenoid is controlled by an electronic control device (e.g., an automatic transmission electronic control unit that is abbreviated as "AT-ECU").

The electronic control device controls a drive electric current (electric power), which is supplied to the linear solenoid, through, for example, a duty ratio control operation. In this embodiment, the electronic control device controls the amount of electric power, which is supplied to the linear solenoid, to control an axial position of the spool 8. Thereby, an opening/closing state of each corresponding port of the spool valve 7 or a degree of communication of each corresponding port of the spool valve 7 is adjusted, and thereby a desired output hydraulic pressure is generated at an output port of the spool valve 7.

In this way, the spool valve 7 generates the output hydraulic pressure, which corresponds to the drive electric current that is supplied to the linear solenoid.

In order to generate the corresponding output hydraulic pressure, which corresponds to the drive electric current supplied to the linear solenoid, it is necessary to adjust the spring load of the spring 5 (the urging force of the spring 5 that urges the spool 8).

Figure 1B:
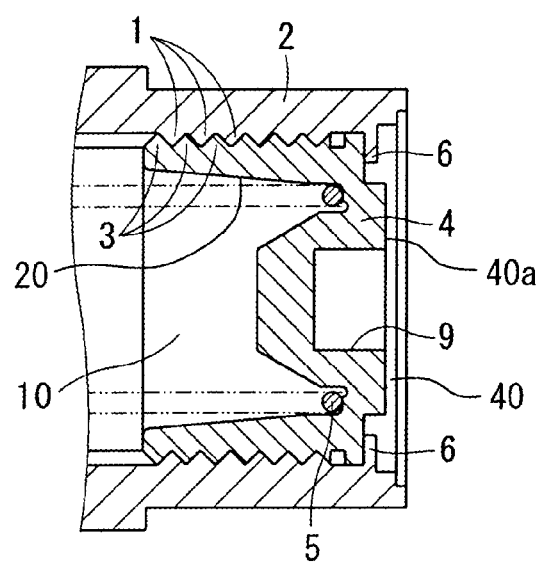
FIG. 1B is a partial cross-sectional view of a spring load adjusting apparatus provided in a spool valve according to the first embodiment.

The spring load adjusting apparatus, which adjusts the spring load of the spring 5, is implemented in the sleeve 2, more specifically, in the right end portion of the sleeve 2, which is located on the side that is opposite from the linear solenoid in FIGS. 1A and 1B.

This spring load adjusting apparatus includes the sleeve 2 (the female-threaded member) and an adjust screw 4, which are threadably engaged with each other.

Specifically, a female thread 1 is formed in an inner peripheral surface of the end portion (the right end portion in FIGS. 1A and 1B) of the sleeve 2, which is axially opposite from the linear solenoid.

Figure 2A:
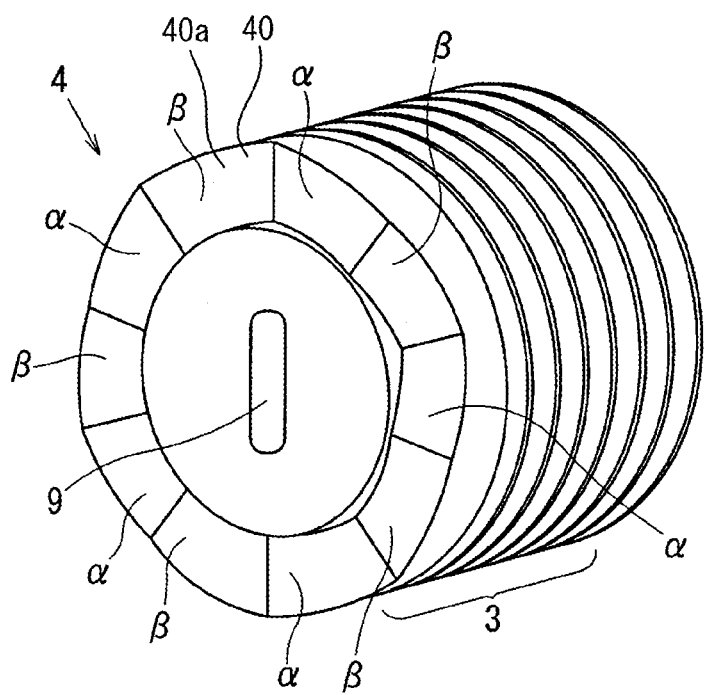
FIG. 2A is a perspective view of an adjust screw of the spring load adjusting apparatus of the first embodiment.
Figure 2B:
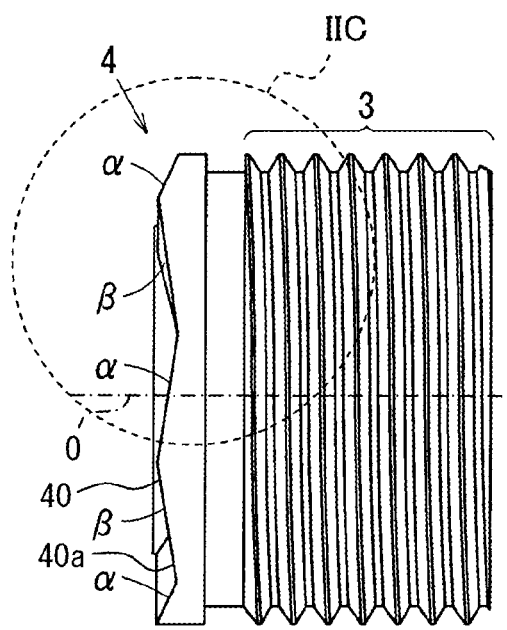
FIG. 2B is a side view of the adjust screw of FIG. 2A.

A male thread 3, which is threadably engaged with the female thread 1 of the sleeve 2, is formed in an outer peripheral surface of the adjust screw 4. Furthermore, a tool-engaging hole 9, into which a driver tool (e.g., a screwdriver) is engaged, is formed in an axial end surface (a right end outer surface in FIGS. 1A and 1B) 40a of a head (axial end portion) 40 of the adjust screw 4. FIG. 2A shows an example of the tool-engaging hole 9, which is configured into a shape of a minus sign (−). However, the shape of the tool-engaging hole 9 is not limited to the minus sign and may be modified to any other appropriate shape (e.g., a hexagon hole having a hexagon shape, which will be described later).

In this embodiment, one end portion of the spring 5 is held and is supported by a spring-holding portion (recess) 20 of the adjust screw 4, and the other end portion of the spring 5, which is opposite from the one end portion of the spring 5, is held and is supported by one end portion of the spool 8 such that the spring 5 is axially compressed between the spring-holding portion 20 of the adjust screw 4 and the one end portion of the spool 8. Therefore, when the amount of thread engagement (the amount of insertion) of the adjust screw 4 relative to the sleeve 2 is adjusted with the driver tool, an axial position of the adjust screw 4 relative to the sleeve 2 is adjusted. Thus, the spring load of the spring 5, which is compressed and is placed in a corresponding location (a spring chamber 10) between the spool 8 and the adjust screw 4, is adjusted.

(First Characteristic Technical Feature)

Depending on a type of an intended use of the spool valve 7, a certain degree of sealing between the sleeve 2 and the adjust screw 4 may be required.

Specific examples of these cases include, for example, a case where the spring chamber 10, which receives the spring 5, is used as a hydraulic pressure chamber (e.g., a damper chamber, a feedback chamber or a pilot hydraulic pressure chamber) and another case where a high hydraulic pressure is applied to an external space of the adjust screw 4, which is located on a side (the right side in FIG. 1B) that is opposite from the spring chamber 10.

In the present embodiment, the required sealing (the predetermined degree of sealing) between the sleeve 2 and the adjust screw 4 is achieved by the forged protrusions 6, which are formed by the plastic deformation of the corresponding portions of the sleeve 2 and are used to urge the adjust screw 4 in the axial direction.

Next, a step of adjusting the adjust screw 4 and a subsequent step of forming the forged protrusions 6 will be described.

First of all, the adjust screw 4 is tightened into the sleeve 2 such that the male thread 3 of the adjust screw 4 is threaded into the female thread 1 of the sleeve 2 by a predetermined amount through use of the driver tool inserted into the tool-engaging hole 9. Thereafter, the amount of thread engagement of the adjust screw 4 relative to the sleeve 2 is finely adjusted to adjust the spring load of the spring 5 to a target spring load.

In this instance, the female thread 1 and the male thread 3 are manufactured according to the screw thread standard defined in, for example, the Japan Industrial standard (JIS). A thread clearance (backlash), which is suitable for the thread engagement between the female thread 1 and the male thread 3, is provided between the female thread 1 and the male thread 3. Because of the presence of the thread clearance, the adjust screw 4 can be easily rotated relative to the sleeve 2. Thereby, the adjustment of the adjust screw 4 can be smoothly performed.

After the completion of the adjustment of the adjust screw 4, the spool valve 7, in which the adjust screw 4 is installed, is placed in a forging jig 11 shown in FIG. 1A. Then, the corresponding portions of the sleeve 2 are plastically deformed by a forging press 12, which is driven by, for example, a hydraulic pressure, so that the forged protrusions 6 are formed, and thereby the adjust screw 4 is urged by the forged protrusions 6 toward the spring 5 in the axial direction.

The forging press 12 includes a plurality of forged-protrusion forming portions 12a and an engaging-hole insert 12b. The forged-protrusion forming portions 12a plastically deform (peel and bend) the corresponding portions of the sleeve 2 to form the forged protrusions 6. The engaging-hole insert 12b is inserted into the tool-engaging hole 9 and limits rotation of the adjust screw 4 during the forging step.

As discussed above, the spring load adjusting apparatus of the present embodiment includes the forged protrusions 6 integrally formed in the sleeve 2. The forged protrusions 6 are forged, i.e., are formed to radially inwardly protrude by the plastic deformation of the corresponding portions of the sleeve 2 and are urged against the adjust screw 4 (the head 40 of the adjust screw 4) in the axial direction to urge the adjust screw 4 toward the spring 5 in the axial direction.

When the forged protrusions 6 urge the adjust screw 4 in the axial direction, a flank of the male thread 3 and a corresponding adjacent flank of the female thread 1 are urged with each other in the axial direction, and thereby the flank of the male thread 3 and the corresponding flank of the female thread 1 are continuously engaged with each other along the spiral grooves of the male and female threads 3, 1. Thereby, the required sealing between the adjust screw 4 and the sleeve 2 (the predetermined degree of sealing between the male thread 3 of the adjust screw 4 and the female thread 1 of the sleeve 2) is achieved.

As discussed above, the required sealing is achieved by the forged protrusions 6, which urge the adjust screw 4 in the axial direction. Therefore, the high processing precision is not required at the time of forming the sleeve 2 and the adjust screw 4. Thereby, it is possible to reduce or minimize the costs needed for achieving the required sealing between the sleeve 2 and the adjust screw 4.

Figure 10:
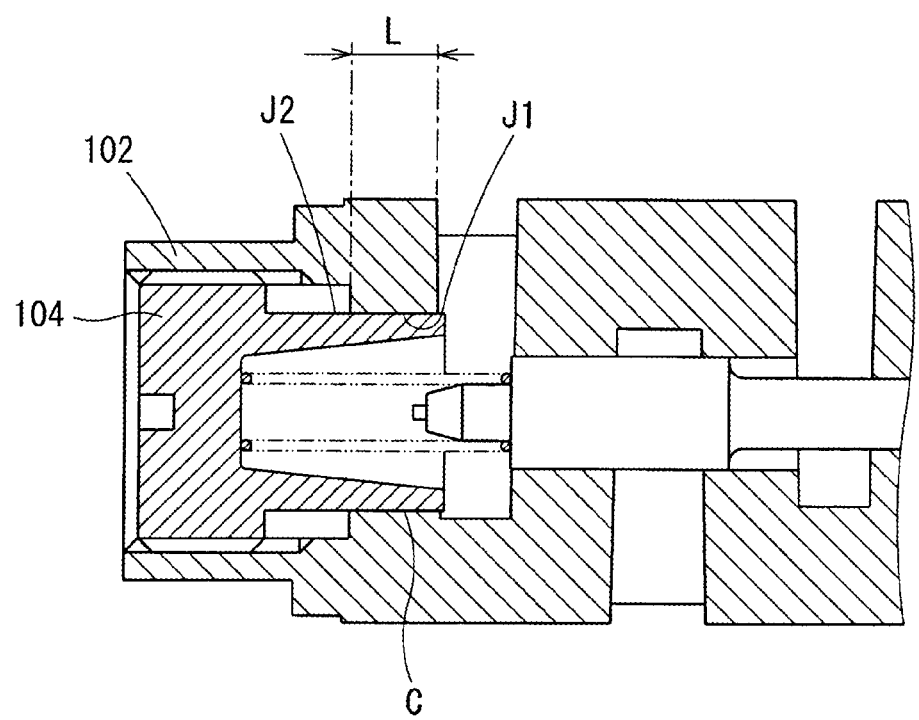
FIG. 10 is a cross-sectional view of a spring load adjusting apparatus of a spool valve according to a prior art technique.

Furthermore, the required sealing is achieved by using the engaged portions (the flanks) of the male and female threads 3, 1, so that the cylindrical tubular hole J1 and the cylindrical tubular portion J2, which are shown in FIG. 10 and are used in the prior art technique, are not required in the present embodiment, and thereby the axial length of the spool valve 7 can be reduced.

As discussed above, the thread clearance (backlash) is present between the female thread 1 and the male thread 3. Therefore, when the flank of the male thread 3 and the corresponding flank of the female thread 1 are urged with each other in the axial direction, a gap is formed by the thread clearance to extend spirally along the grooves of the male and female threads 3, 1.

However, this spiral gap (the gap that spirally extends) opens at only two points, i.e., a thread engagement start point and a thread engagement end point of the thread engagement between the male thread 3 and the female thread 1. Therefore, a total length of the sealing between the male thread 3 and the female thread 1 is relatively long, and the spiral gap is relatively narrow. Thus, leakage of the fluid, which would be caused by the presence of the spiral gap beyond the sealing, is limited or minimized.

(Second Characteristic Technical Feature)

In the present embodiment, the required sealing between the sleeve 2 and the adjust screw 4 is achieved by the forged protrusions 6, which are formed by the plastic deformation of the corresponding portions of the sleeve 2 and are used to urge the adjust screw 4 in the axial direction.

Although a single continuous forged protrusion, which extends continuously in the circumferential direction, may be formed, the multiple forged protrusions 6 are respectively formed at multiple locations, i.e., a plurality of locations (three locations in the first embodiment, as shown in FIGS. 3A, 3B).

When the forged protrusions 6 are arranged intermittently in the circumferential direction, the required forging force, which is required to plastically deform the corresponding portions of the sleeve 2, can be reduced or minimized.

Therefore, it is possible to limit or minimize distortion of the sleeve 2, which would be generated by the application of the forging force. As a result, negative influences of the distortion of the sleeve 2, which would be caused by the forging force, on a hydraulic pressure control structure of the spool valve 7 can be limited or avoided. Furthermore, when the forging force is limited or minimized, the costs, which are required for the formation of the forged protrusions 6, can be limited or minimized.

(Third Characteristic Technical Feature)

As shown in FIGS. 2A to 3B, a plurality of primary slopes α and a plurality of secondary slopes β are formed in the end surface 40a of the head 40 of the adjust screw 4. The primary slopes α and the secondary slopes β are alternately continuously arranged one after another in the circumferential direction along an outer peripheral edge of the axial end surface 40a of the adjust screw 4, and thereby a plurality of peaks (apexes) P and a plurality of valleys V are alternately arranged one after another in the circumferential direction. When the urging force is applied from one of the forged protrusions 6 against a corresponding one of the primary slopes α, this corresponding primary slope α exerts a tightening rotational force in the adjust screw 4 in a tightening direction of the adjust screw 4 (e.g., a clockwise direction in a case where the male thread 3 of the adjust screw 4 is a right hand thread). In contrast, when the urging force is applied from one of the forged protrusions 6 against a corresponding one of the secondary slopes β, this corresponding secondary slope β exerts a loosening rotational force in the adjust screw 4 in a loosening direction of the adjust screw 4 (e.g., a counterclockwise direction in the case where the male thread 3 of the adjust screw 4 is the right hand thread), which is opposite from the tightening direction in the circumferential direction.

At least one of the multiple forged protrusions 6, which are provided at the multiple circumferential locations, respectively, is set to urge at least one of the primary slopes α, and at least another one of the multiple forged protrusions 6 is set to urge at least one of the secondary slopes β.

In this way, the rotation of the adjust screw 4 is limited in both of the tightening direction and the loosening direction. Thereby, it is possible to limit an unintentional change in the adjusted position of the adjust screw 4 upon application of, for example, vibration and/or shock to the adjust screw 4.

Figure 2C:
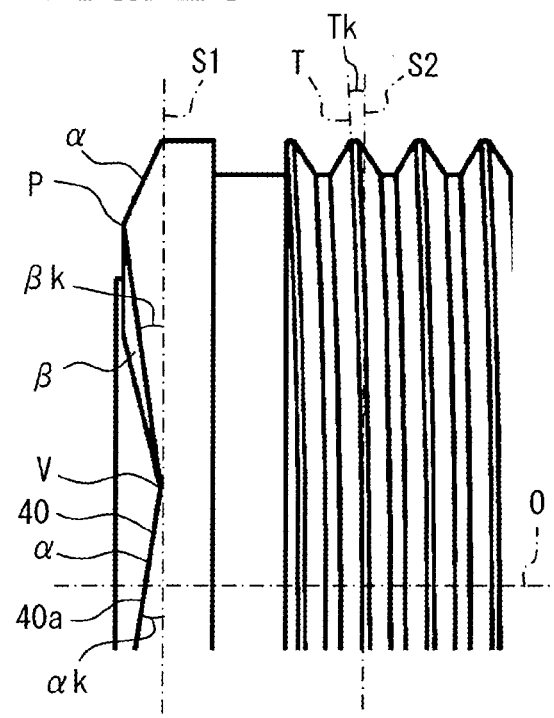
FIG. 2C is a partial enlarged view of an area IIC of FIG. 2B.

In this instance, as shown in FIG. 2C, a slope angle αk of each primary slope α and a slope angle βk of each secondary slope β are measured relative to an imaginary plane S1 that is perpendicular to the central axis O of the adjust screw 4. An absolute value of the slope angle αk of each primary slope α and an absolute value of the slope angle βk of each secondary slope β are generally equal to each other. Although the slope angle αk of each primary slope α and the slope angle βk of each secondary slope β do not need to be limited to any particular angle, the absolute value of the slope angle αk of each primary slope α and the absolute value of the slope angle βk of each secondary slope β are equal to each other and are larger than an absolute value of a lead angle Tk of the male thread 3. The lead angle Tk is an angle measured between a helix of the male thread 3 (see an imaginary line T that is an extension of the helix, which is defined by an edge of a crest of the male thread 3 in this instance) of the adjust screw 4 and an imaginary plane S2 that is perpendicular to the axis O of the adjust screw 4.

(Fourth Characteristic Technical Feature)

In the description of the fourth characteristic technical feature of the first embodiment, a specific example of the above-described third characteristic technical feature of the first embodiment will be described.

As shown in FIG. 2A, the primary slopes α and the secondary slopes β are alternately and continuously arranged one after another in the circumferential direction in the axial end surface 40a of the adjust screw 4 along an outer peripheral edge of the axial end surface 40a of the adjust screw 4, and each of the primary slopes α and the secondary slopes β has an angular extent θ in the circumferential direction about the central axis O of the adjust screw 4. The angular extent θ may be expressed in terms of degrees (°) or in terms of length.

In the present embodiment, as shown in FIGS. 3A and 3B, the number of the forged protrusions 6 is three, and these three forged protrusions 6 are arranged one after another about the central axis O of the adjust screw 4 such that the three forged protrusions 6 are arranged one after another at generally equal intervals (measured as circumferential center to circumferential center intervals) in the circumferential direction. More specifically, the three forged protrusions 6 are arranged one after another at 120 degree intervals in the circumferential direction.

Under the above-described circumstance, the primary slopes α and the secondary slopes β are arranged such that one of the three forged protrusions 6 arranged one after another at 120 degree intervals urges the corresponding one of the primary slopes α, and another one of the three forged protrusions 6 urges the corresponding one of the secondary slopes β.

Specifically, the primary slopes α and the secondary slopes β are arranged such that the angular extent θ of each of the primary slopes α and the secondary slopes β is set to satisfy the following equation of:

$$\theta = 360 \text{ degrees}/(3N+1)$$

where N is an odd number that is equal to or larger than 1.

More specifically, in this embodiment, N of the above equation is 3 (i.e., N=3). As shown in FIGS. 3A and 3B, the axial end surface 40a of the adjust screw 4 is circumferentially divided into ten segments, which form the five primary slopes α and the five secondary slopes β alternately arranged one after another in the circumferential direction.

Even with this arrangement, as shown in FIGS. 3A and 3B, the two forged protrusions 6 out of the three forged protrusions 6 reliably axially urge the corresponding primary slope α and the corresponding secondary slope β, respectively.

Therefore, the rotation of the adjust screw 4 is limited in both of the tightening direction and the loosening direction of the adjust screw 4. Therefore, it is possible to avoid the change in the adjusted position of the adjust screw 4 upon application of, for example, the vibration and/or shock to the adjust screw 4.

Second Embodiment

Figure 4:
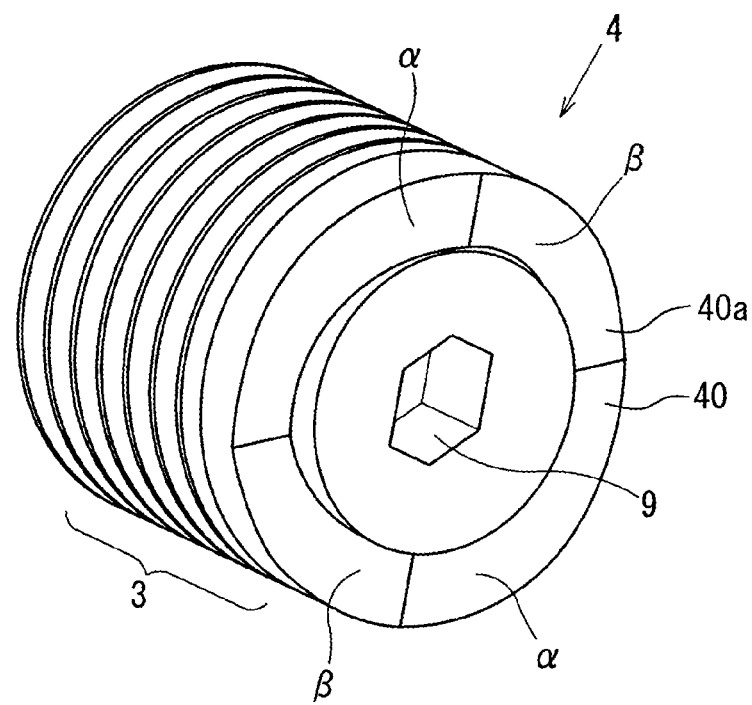
FIG. 4 is a perspective view of an adjust screw of a spring load adjusting apparatus according to a second embodiment of the present disclosure.

A second embodiment of the present disclosure will be described with reference to FIG. 4. In the following embodiments, components similar to those of the first embodiment will be indicated by the same reference numerals.

In the first embodiment, N of the above equation is set to be three (i.e., N=3). In contrast, in the second embodiment, N is set to be one (N=1). Thereby, as shown in FIG. 4, the axial end surface 40a of the adjust screw 4 is divided into four segments to form the two primary slopes β and the two secondary slopes β, which are alternately arranged one after another in the circumferential direction.

With this construction, the two primary slopes α are arranged symmetrically about the central axis O of the adjust screw 4, i.e., are diametrically opposed to each other about the central axis O of the adjust screw 4. Also, the two secondary slopes β are arranged symmetrically about the central axis O of the adjust screw 4, i.e., are diametrically opposed to each other about the central axis O of the adjust screw 4.

In the second embodiment, the number of the forged protrusions 6 is three like in the first embodiment, and these three forged protrusions 6 are arranged one after another at the generally equal intervals (i.e., 120 degree intervals) in the circumferential direction about the central axis O of the adjust screw 4.

Even in the case of the second embodiment, in which the two primary slopes α are arranged symmetrically about the central axis O of the adjust screw 4, and the two secondary slopes β are arranged symmetrically about the central axis O of the adjust screw 4, the two forged protrusions 6 out of the three forged protrusions 6 reliably axially urge the corresponding primary slope α and the corresponding secondary slope β, respectively.

Therefore, the rotation of the adjust screw 4 is limited in both of the tightening direction and the loosening direction of the adjust screw 4. Thereby, it is possible to avoid the change in the adjusted position of the adjust screw 4 upon application of, for example, the vibration and/or shock to the adjust screw 4.

Third Embodiment

Figure 5:
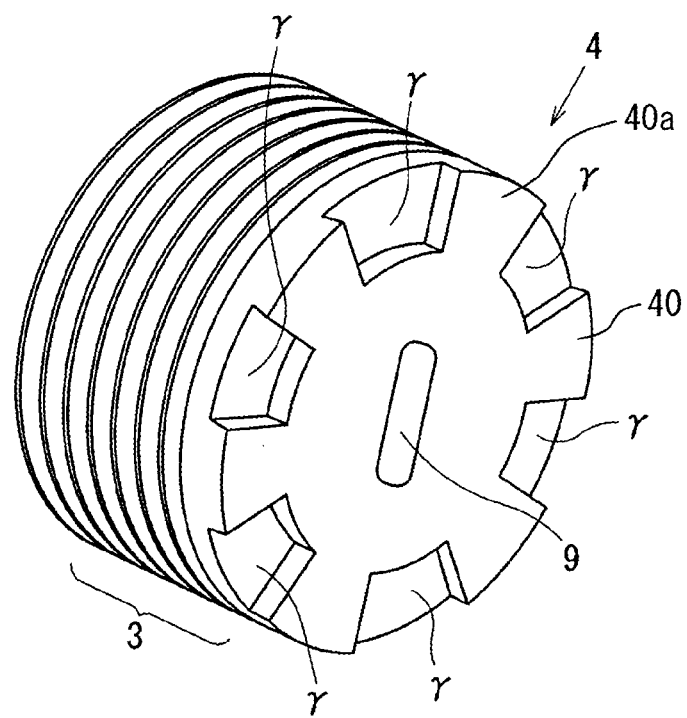
FIG. 5 is a perspective view of an adjust screw of a spring load adjusting apparatus according to a third embodiment of the present disclosure.

A third embodiment of the present disclosure will be described with reference to FIG. 5.

In the third embodiment, the axial end surface 40a of the head 40 of the adjust screw 4 has a plurality of axial recesses γ, which correspond to the forged protrusions 6. At the time of forming the forged protrusions 6 through the plastic deformation, each of the forged protrusions 6 is fitted into a corresponding one of the axial recesses γ.

A circumferential extent of each of the forged protrusions 6 is generally equal to (or slightly smaller than) a circumferential extent of each of the axial recesses γ. When each of the forged protrusions 6 is fitted into the corresponding one of the axial recesses γ, the rotation of the adjust screw 4 is limited in both of the tightening direction and the loosening direction.

Thereby, it is possible to limit an unintentional change in the adjusted position of the adjust screw 4 upon application of, for example, the vibration and/or shock to the adjust screw 4.

Fourth Embodiment

Figure 6:
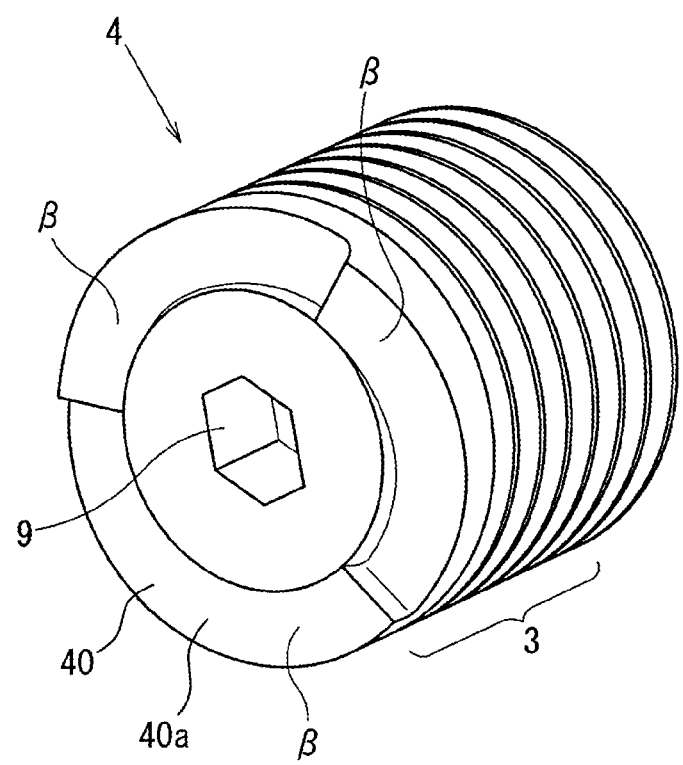
FIG. 6 is a perspective view of an adjust screw of a spring load adjusting apparatus according to a fourth embodiment of the present disclosure.

A fourth embodiment of the present disclosure will be described with reference to FIG. 6.

In the fourth embodiment, the axial end surface 40a of the head 40 of the adjust screw 4 has only the secondary slopes β, each of which has the slope angle βk that is generally equal to the lead angle Tk of the male thread 3 unlike the first embodiment. The forged protrusions 6 urge only the secondary slopes β.

With this construction, the urging force of each of the forged protrusions 6 is exerted in a direction that is generally perpendicular to the helix of the male thread 3, which defines the lead angle Tk relative to the imaginary plane S2 that is perpendicular to the central axis O of the adjust screw 4. Therefore, the urging force of each of the forged protrusions 6 does not generate the rotational force in any of the tightening direction and the loosening direction of the adjust screw 4, and the urging force of each of the forged protrusions 6 is exerted only as the urging force, which urges the flank of the male thread 3 and the adjacent flank of the female thread 1 with each other.

As a result, a frictional force of the adjust screw 4 relative to the sleeve 2 can be increased, and thereby it is possible to limit the change in the adjusted position of the adjust screw 4 upon application of, for example, the vibration and/or shock to the adjust screw 4.

Fifth Embodiment

Figure 7A:
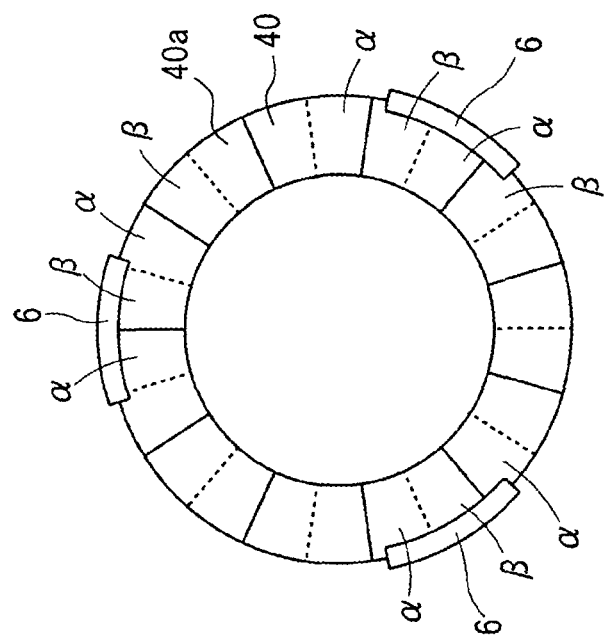
FIG. 7A is a schematic end view of an adjust screw of a spring load adjusting apparatus according to a fifth embodiment of the present disclosure, showing a relationship of primary and secondary slopes of the adjust screw relative to forged protrusions of a sleeve of the spring load adjusting apparatus.
Figure 7B:
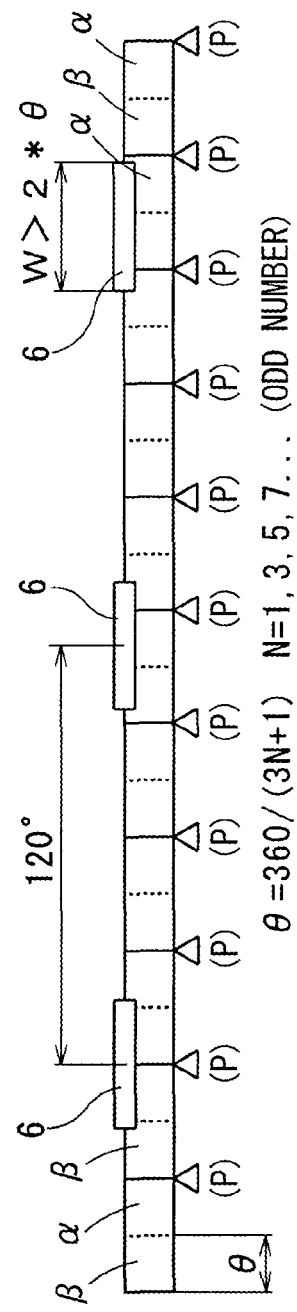
FIG. 7B is a schematic exploded view showing the relationship of the primary and secondary slopes of the adjust screw relative to the forged protrusions of the sleeve according to the fifth embodiment.

A fifth embodiment of the present disclosure will be described with reference to FIGS. 7A and 7B. The fifth embodiment is a modification (an improvement) of the first embodiment.

In the first embodiment, the axial positions of the forged protrusions 6 in the axial direction of the adjust screw 4 may possibly vary (differ) from each other depending on the rotational position of the adjust screw 4.

In the case where the axial positions of the forged protrusions 6 are different from each other, a forging load, which is applied from each of the forged protrusions 6 to the adjust screw 4, may possibly vary among the forged protrusions 6. This will result in application of a biased load to the adjust screw 4 and thereby possibly deteriorating the sealing between the sleeve 2 and the adjust screw 4.

In the fifth embodiment, a circumferential length (circumferential extent) W of each of the three forged protrusions 6 is set to be larger than a predetermined circumferential length that is twice larger than the angular extent θ of each of the primary slopes α and the secondary slopes β. Specifically, the circumferential length W of each of the three forged protrusions 6 is set to satisfy the relationship of W>2θ.

Thereby, in the fifth embodiment, regardless of the rotational position of the adjust screw 4, each of the three forged protrusions 6 is forged, i.e., is plastically deformed to axially overlap with at least one of the peaks P (see a triangular mark in FIG. 7B) located between the corresponding primary slope α and the corresponding secondary slope β, which are circumferentially adjacent to each other.

Therefore, the adjust screw 4 receives the axial forging load from each of the three forged protrusions 6 at each corresponding peak P located between the corresponding primary slope α and the corresponding secondary slope β.

Thereby, the forging loads are generally equally applied from the three forged protrusions 6 to the adjust screw 4 while avoiding the application of the biased load against the adjust screw 4. As a result, the sealing between the sleeve 2 and the adjust screw 4 can be more reliably maintained.

The above technique of the fifth embodiment (the circumferential length of each of the forged protrusions 6 being set to satisfy the relationship of W>2θ) may be applied to the spring load adjusting apparatus, which uses two forged protrusions 6.

Sixth Embodiment

Figure 8A:
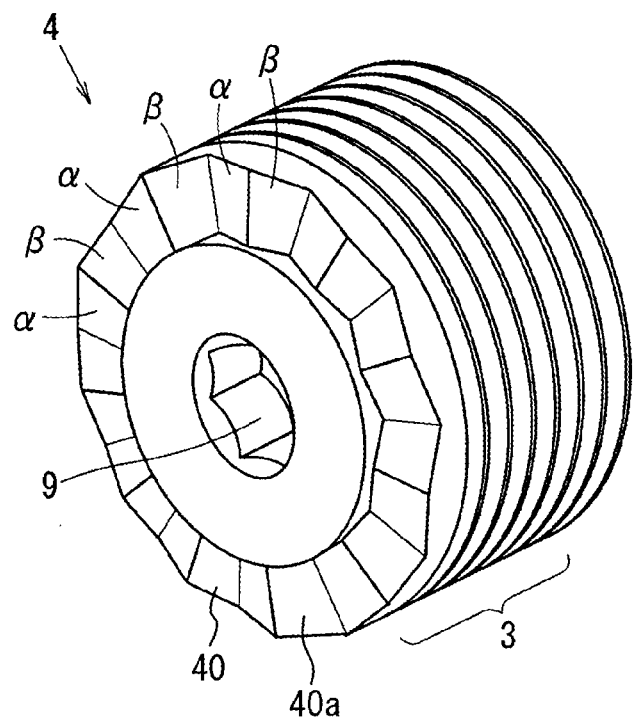
FIG. 8A is a perspective view of an adjust screw of a spring load adjusting apparatus according to a sixth embodiment of the present disclosure.
Figure 8B:
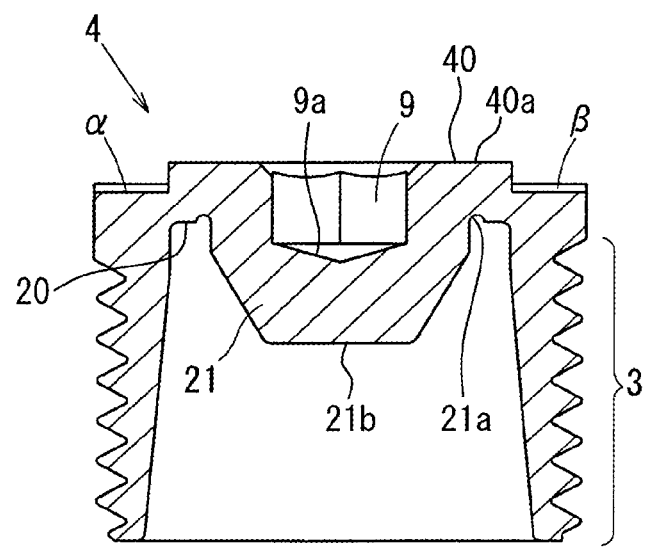
FIG. 8B is a cross-sectional view of the adjust screw shown in FIG. 8A.

A sixth embodiment of the present disclosure will be described with reference to FIGS. 8A and 8B.

The technique of the sixth embodiment is suitable for the case where the inner diameter of the spring (the compression coil spring) 5 is relatively large.

The adjust screw 4 of the sixth embodiment includes a centering projection 21, which is formed in the spring-holding portion 20 of the adjust screw 4. The centering projection 21 axially projects into the spring 5 at a radially inner side of the spring 5 and guides an inner peripheral portion of the spring 5 such that the spring 5 is centered by the centering projection 21 relative to the adjust screw 4. The centering projection 21 has an axial wall thickness that is relatively larger.

In the sixth embodiment, the tool-engaging hole 9 (hexagonal hole) is formed in the axial end surface 40a of the adjust screw 4 and axially extends into the centering projection 21, which is placed radially inward of the spring 5 and has the relatively large axial wall thickness. Thereby, a bottom surface (a lower bottom surface in FIG. 8B) 9a of the tool-engaging hole 9 is located on an axial side (lower side in FIG. 8B) of a base 21a of the centering projection 21 where a projecting end 21b of the centering projection 21 is located. Since the axial wall thickness of the centering projection 21 is relatively large, the tool-engaging hole 9 (hexagonal hole), which has the relatively large axial depth, can be advantageously formed in the centering projection 21.

As discussed above, the tool-engaging hole 9 is formed by utilizing the relatively large wall thickness of the centering projection 21, which is inserted into the inside of the spring 5. Therefore, the axial size of the spring load adjusting apparatus can be made relative short, and thereby the axial length of the spool valve 7 can be made relatively short.

Seventh Embodiment

Figure 9A:
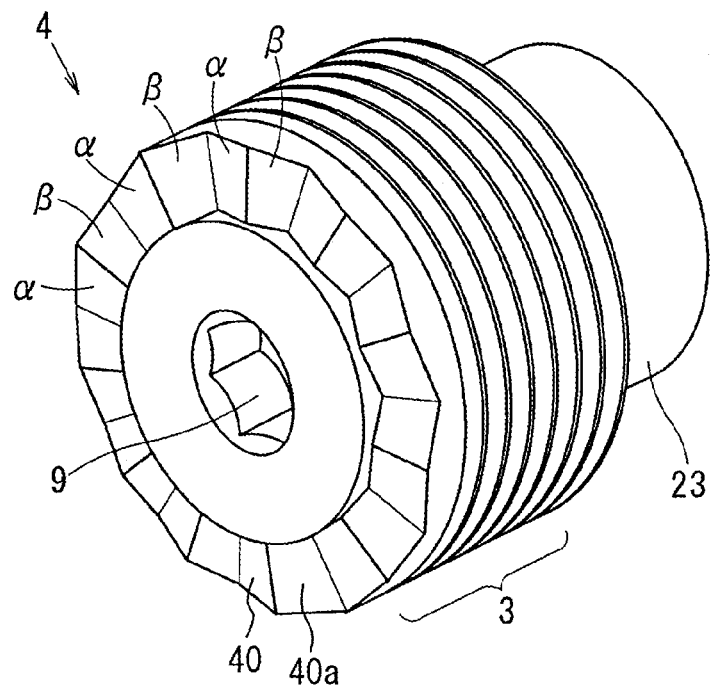
FIG. 9A is a perspective view of an adjust screw of a spring load adjusting apparatus according to a seventh embodiment of the present disclosure.
Figure 9B:
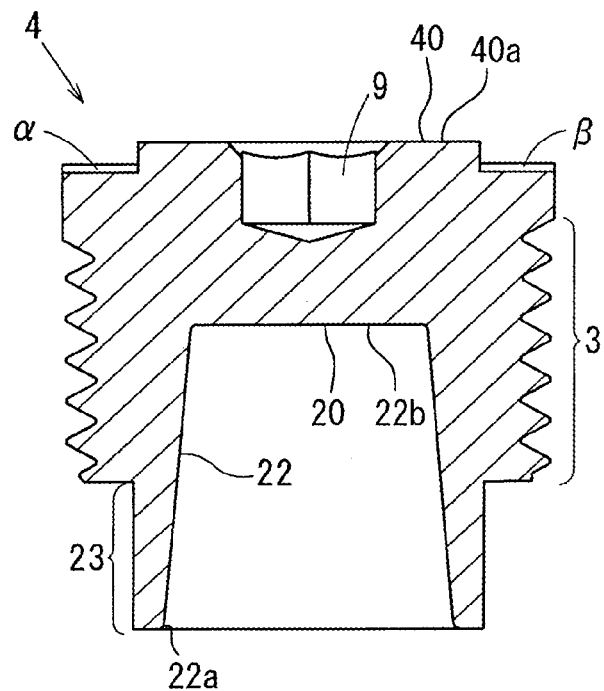
FIG. 9B is a cross-sectional view of the adjust screw shown in FIG. 9A.

A seventh embodiment of the present disclosure will be described with reference to FIGS. 9A and 9B.

The technique of the seventh embodiment is suitable for the case where the outer diameter of the spring (the compression coil spring) 5 is relatively small.

The adjust screw 4 of the seventh embodiment includes a centering recess 22, which is formed in the spring-holding portion 20 of the adjust screw 4 and receives the one end portion of the spring 5 therein such that the inner peripheral wall of the centering recess 22 circumferentially surrounds the one end portion of the spring 5 to center the spring 5 relative to the adjust screw 4.

The centering recess 22 is configured into a generally cylindrical tubular form (more specifically, a conical frustum form), and an inner peripheral wall of the centering recess 22 is tapered such that an inner diameter of the inner peripheral wall of the centering recess 22 increases from a flat bottom 22b toward an insertion opening 22a of the centering recess 22. That is, the inner diameter of the centering recess 22 progressively increases from the flat bottom 22b to the insertion opening 22a of the centering recess 22. Here, the flat bottom 22b forms a contact part, to which the one end portion of the spring 5 contacts, and the insertion opening 22a is an opening, through which the one end portion of the spring 5 is received into the centering recess 22. Furthermore, the adjust screw 4 includes an extended tubular portion 23, by which an axial length of the centering recess 22 is increased from the axial end (lower end in FIG. 9B) of the male thread 3.

In the present embodiment where the insertion opening 22a of the centering recess 22 is enlarged, and the axial depth of the centering recess 22 is enlarged by the extended tubular portion 23, as discussed above. Thereby, the spring 5 can be reliably installed in the centering recess 22 while holding the spring 5 such that the axis of the spring 5 is generally parallel to the axis of the sleeve 2. The spring 5 can be easily bent (easily buckled) due to the small outer diameter of the spring 5 relative to the thread size of the adjust screw 4. However, the above construction of the present embodiment can advantageously receive and hold the spring 5 in the centering recess 22 in the above described manner.

Now, modifications of the above embodiments will be described.

In the above embodiments, the primary slopes α and/or the secondary slopes β are continuously arranged one after another in the circumferential direction. Alternatively, the primary slope(s) α and/or the secondary slope(s) β may be only partially provided in the circumferential direction (i.e., may be intermittently formed). Specifically, the partially formed primary and/or secondary slopes α, β, which are formed partially in the head 40 of the adjust screw 4 may be securely urged by the forged protrusions 6.

In the above embodiments, the linear solenoid is used as the drive device of the spool valve 7. However, the present disclosure is not limited to this, and any other type of drive device, such as another type of actuator or a drive device using a pilot hydraulic pressure, may be alternatively used.

In the above embodiments, the present disclosure is applied to the spool valve 7, which is used in the hydraulic pressure control apparatus of the automatic transmission of the vehicle. Alternatively, the present disclosure may be applied to any other type of spool valve used in any other apparatus that is different from the automatic transmission.

In the above embodiments, the present disclosure is applied to the spring load adjusting apparatus of the spool valve 7. However, the present disclosure is not limited to this. That is, the present disclosure may be applied to any other type of spring load adjusting apparatus, which is other than the spool valve 7, as long as such a spring load adjusting apparatus requires the certain degree of sealing between the female-threaded member and the adjust screw 4.

In the above embodiments, the male thread 3 of the adjust screw 4 is formed as the right hand thread. Alternatively, the male thread 3 of the adjust screw 4 may be formed as a left hand thread.

Furthermore, the number of the forged protrusions 6 may be changed to any appropriate number in any of the above embodiments. For instance, the number of the forged protrusions 6 may be changed to two. In such a case, the two forged protrusions 6 are arranged one after another at generally equal intervals (measured as circumferential center to circumferential center intervals) in the circumferential direction. More, specifically, the two forged protrusions are arranged one after another at 180 degree intervals in the circumferential direction. Furthermore, in such a case, the angular extent θ of each of the primary slopes α and the secondary slopes β may be set to satisfy the following equation of:

$$\theta = 360 \text{ degrees}/2N$$

where N is an odd number that is equal to or larger than 3.

Also, the number of the forged protrusions 6 may be changed to more than three. Furthermore, alternative to the multiple forged protrusions 6, a single forged protrusion 6 may be provided, if desired. The shape of the single protrusion 6 may be similar to the shape of the protrusion 6 of the first embodiment shown in FIGS. 3A and 3B or the shape of the protrusion 6 of the fifth embodiment shown in FIGS. 7A and 7B. Alternatively, the shape of the single protrusion 6 may be annular that circumferentially continuously extends all around about the central axis O of the adjust screw 4.

Additional advantages and modifications will readily occur to those skilled in the art. The present disclosure in its broader terms is therefore not limited to the specific details, representative apparatus, and illustrative examples shown and described.

What is claimed is:

1. A spring load adjusting apparatus comprising:
   a female-threaded member that has a female thread, which is formed in an inner peripheral surface of the female-threaded member; and
   an adjust screw that adjusts a spring load of a spring, which is placed in an inside of the female-threaded member, wherein:
   the adjust screw has a male thread, which is formed in an outer peripheral surface of the adjust screw and is threadably engaged with the female thread;
   the female-threaded member has at least one protrusion that is formed integrally with the rest of the female-threaded member and is urged against a head of the adjust screw toward the spring in an axial direction to urge the male thread against the female thread and thereby to provide a predetermined degree of sealing between the male thread and the female thread, and the at least one protrusion is urged against the head of the adjust screw in the axial direction so that the at least one protrusion limits rotation of the adjust screw in both of a tightening direction and a loosening direction of the adjust screw.

2. The spring load adjusting apparatus according to claim 1, wherein the at least one protrusion includes a plurality of protrusions.

3. The spring load adjusting apparatus according to claim 2, wherein an axial end surface of the adjust screw includes:
   at least one primary slope that receives an urging force from a corresponding one of the plurality of protrusions to exert a rotational force against the adjust screw in a tightening direction of the adjust screw; and
   at least one secondary slope that receives an urging force from a corresponding one of the plurality of protrusions to exert a rotational force against the adjust screw in a loosening direction of the adjust screw, which is opposite from the tightening direction of the adjust screw.

4. The spring load adjusting apparatus according to claim 3, wherein:
   the at least one primary slope includes a plurality of primary slopes;
   the at least one secondary slope includes a plurality of secondary slopes;
   the plurality of primary slopes and the plurality of secondary slopes are alternately continuously arranged one after another in a circumferential direction along an outer peripheral edge of the axial end surface of the adjust screw;
   each of the plurality of primary slopes and the plurality of secondary slopes circumferentially extends for a predetermined angular extent;
   the plurality of protrusions includes two protrusions, which are circumferentially arranged one after another at generally equal intervals about a central axis of the adjust screw; and
   the predetermined angular extent of each of the plurality of primary slopes and the plurality of secondary slopes is set to satisfy the following equation:

$$\theta = 360 \text{ degrees}/2N$$

where $\theta$ denotes the predetermined angular extent of each of the plurality of primary slopes and the plurality of secondary slopes, and N is an odd number that is equal to or larger than 3.

5. The spring load adjusting apparatus according to claim 3, wherein:
   the at least one primary slope includes a plurality of primary slopes;
   the at least one secondary slope includes a plurality of secondary slopes;
   the plurality of primary slopes and the plurality of secondary slopes are alternately continuously arranged one after another in a circumferential direction along an outer peripheral edge of the axial end surface of the adjust screw;
   each of the plurality of primary slopes and the plurality of secondary slopes circumferentially extends for a predetermined angular extent;
   the plurality of protrusions includes three protrusions, which are circumferentially arranged one after another at generally equal intervals about a central axis of the adjust screw; and
   the predetermined angular extent of each of the plurality of primary slopes and the plurality of secondary slopes is set to satisfy the following equation:

$$\theta = 360 \text{ degrees}/(3N+1)$$

where $\theta$ denotes the predetermined angular extent of each of the plurality of primary slopes and the plurality of secondary slopes, and N is an odd number that is equal to or larger than 1.

6. The spring load adjusting apparatus according to claim 2, wherein:
   an axial end surface of the adjust screw includes a plurality of primary slopes and a plurality of secondary slopes;
   the plurality of primary slopes and the plurality of secondary slopes are alternately continuously arranged one after another in a circumferential direction along an outer peripheral edge of the axial end surface of the adjust screw to form a plurality of peaks and a plurality of valleys, which are alternately arranged one after another in the circumferential direction;
   each of the plurality of protrusions is urged against a corresponding one of the plurality of peaks;
   each of the plurality of primary slopes and the plurality of secondary slopes circumferentially extends for a predetermined angular extent; and
   a circumferential length of each of the plurality of protrusions is set to be larger than a predetermined circumferential length, which is twice larger than the predetermined angular extent of each of the plurality of primary slopes and the plurality of secondary slopes.

7. The spring load adjusting apparatus according to claim 2, wherein an axial end surface of the adjust screw includes a plurality of recesses, each of which is recessed in the axial direction and receives a corresponding one of the plurality of protrusions.

8. The spring load adjusting apparatus according to claim 2, wherein:
   an axial end surface of the adjust screw includes a plurality of slopes, each of which is tilted by a predetermined angle relative to an imaginary plane that is perpendicular to a central axis of the adjust screw;
   the predetermined angle of each of the plurality of slopes is generally the same as a lead angle of the male thread; and
   each of the plurality of protrusions is urged against a corresponding one of the plurality of slopes.

9. The spring load adjusting apparatus according claim 1, wherein:
   the spring is a compression coil spring;
   the adjust screw has a spring-holding portion that holds and supports one end portion of the spring;
   the spring-holding portion includes a centering projection that axially projects into the spring and guides an inner peripheral portion of the spring such that the spring is centered by the centering projection relative to the adjust screw; and
   a tool-engaging hole is formed in an axial end surface of the adjust screw and axially extends into the centering projection.

10. The spring load adjusting apparatus according to claim 1, wherein:
   the spring is a compression coil spring;
   the adjust screw has a spring-holding portion that holds and supports one end portion of the spring;
   the spring-holding portion includes a centering recess that guides an outer peripheral portion of the spring such that the spring is centered by the centering recess relative to the adjust screw;
   an inner diameter of the centering recess is progressively increased from a bottom of the centering recess to an insertion opening of the centering recess, through which the one end portion of the spring is inserted into the centering recess; and the adjust screw includes an extended tubular portion, by which an axial length of the centering recess is increased.

11. The spring load adjusting apparatus according to claim 1, wherein:
the spring load adjusting apparatus is provided in a spool valve, which controls a hydraulic pressure of an automatic transmission; and
the female-threaded member is a sleeve of the spool valve.

12. The spring load adjusting apparatus according to claim 1, wherein:
the female-threaded member is made of metal; and
each protrusion of the female-threaded member is formed by plastically deforming a corresponding portion of the female-threaded member.

13. A manufacturing method of a spring load adjusting apparatus, comprising:
tightening an adjust screw into a female-threaded member made of metal to adjust a spring load of a spring placed in an inside of the female-threaded member; and
plastically deforming at least one portion of the female-threaded member to form at least one protrusion that is urged against a head of the adjust screw toward the spring in an axial direction so that the protrusion limits rotation of the adjust screw in both of a tightening direction and a loosening direction of the adjust screw, so that a male thread, which is formed in an outer peripheral surface of the adjust screw, is urged against a female thread, which is formed in an inner peripheral surface of the female-threaded member, and thereby a predetermined degree of sealing is provided between the male thread and the female thread.

14. The manufacturing method according to claim 13, wherein the plastically deforming of the at least one portion of the female-threaded member to form the at least one protrusion includes plastically deforming a plurality of portions of the female-threaded member to form a plurality of protrusions.

15. The manufacturing method according to claim 14, wherein the plastically deforming of the plurality of portions of the female-threaded member to form the plurality of protrusions includes plastically deforming the plurality of protrusions of the female-threaded member such that:
at least one of the plurality of protrusions is urged against at least one primary slope, which is formed in an axial end surface of the adjust screw, to exert a rotational force against the adjust screw in a tightening direction of the adjust screw; and
at least another one of the plurality of protrusions is urged against at least one secondary slope, which is formed in the axial end surface of the adjust screw, to exert a rotational force against the adjust screw in a loosening direction of the adjust screw, which is opposite from the tightening direction of the adjust screw.

16. The manufacturing method according to claim 14, wherein:
the plastically deforming of the plurality of portions of the female-threaded member to form the plurality of protrusions includes plastically deforming the plurality of protrusions of the female-threaded member such that each of the plurality of protrusions is urged against a corresponding one of a plurality of peaks, each of which is formed between a corresponding one of a plurality of primary slopes and a corresponding one of a plurality of secondary slopes formed in an axial end surface of the adjust screw;
the plurality of primary slopes and the plurality of secondary slopes are alternately continuously arranged one after another in a circumferential direction along an outer peripheral edge of the axial end surface of the adjust screw;
each of the plurality of primary slopes and the plurality of secondary slopes circumferentially extends for a predetermined angular extent; and
a circumferential length of each of the plurality of protrusions is set to be larger than a predetermined circumferential length, which is twice larger than the predetermined angular extent of each of the plurality of primary slopes and the plurality of secondary slopes.

17. The manufacturing method according to claim 14, wherein the plastically deforming of the plurality of portions of the female-threaded member to form the plurality of protrusions includes plastically deforming the plurality of protrusions of the female-threaded member such that each of the plurality of protrusions is received in and is urged against a corresponding one of a plurality of recesses formed in an axial end surface of the adjust screw.

18. The manufacturing method according to claim 14, wherein the plastically deforming of the plurality of portions of the female-threaded member to form the plurality of protrusions includes plastically deforming the plurality of protrusions of the female-threaded member such that each of the plurality of protrusions is urged against a corresponding one of a plurality of slopes, each of which is tilted by a predetermined angle relative to an imaginary plane that is perpendicular to a central axis of the adjust screw, and the predetermined angle of each of the plurality of slopes is generally the same as a lead angle of the male thread.

* * * * *